April 2, 1929. W. H. NICHOLLS 1,707,411
AUTOMATICALLY OPERATING MOLD MAKING MACHINE
Filed April 1, 1926 6 Sheets-Sheet 1

Fig. 1.

INVENTOR
William H. Nicholls
BY
ATTORNEYS

April 2, 1929. W. H. NICHOLLS 1,707,411
AUTOMATICALLY OPERATING MOLD MAKING MACHINE
Filed April 1, 1926 6 Sheets-Sheet 2

Fig.2.

INVENTOR
William H. Nicholls.
BY
ATTORNEYS

April 2, 1929.   W. H. NICHOLLS   1,707,411
AUTOMATICALLY OPERATING MOLD MAKING MACHINE
Filed April 1, 1926   6 Sheets-Sheet 3

INVENTOR
*William H. Nicholls*
BY
ATTORNEYS

April 2, 1929.  W. H. NICHOLLS  1,707,411
AUTOMATICALLY OPERATING MOLD MAKING MACHINE
Filed April 1, 1926  6 Sheets-Sheet 4

Fig. 4.

INVENTOR
William H. Nicholls
BY
ATTORNEYS

April 2, 1929.  W. H. NICHOLLS  1,707,411
AUTOMATICALLY OPERATING MOLD MAKING MACHINE
Filed April 1, 1926  6 Sheets-Sheet 5

April 2, 1929.  W. H. NICHOLLS  1,707,411
AUTOMATICALLY OPERATING MOLD MAKING MACHINE
Filed April 1, 1926  6 Sheets-Sheet 6

INVENTOR
William H. Nicholls
BY
ATTORNEYS

Patented Apr. 2, 1929.

1,707,411

UNITED STATES PATENT OFFICE.

WILLIAM H. NICHOLLS, OF BROOKLYN, NEW YORK.

AUTOMATICALLY-OPERATING MOLD-MAKING MACHINE.

Application filed April 1, 1926. Serial No. 98,981.

One of the objects of this invention is to greatly facilitate the forming of molds for castings and to facilitate the handling of the flasks in which the molds are formed.

Another object is to provide an apparatus capable of automatically performing the various operations involved in the forming of molds.

Another object is the provision of an apparatus adapted to fill the mold flasks with sand, jolt them, squeeze the sand within the flasks to form the molds, draw the patterns from the molds and deliver the flasks with the completed molds outwardly away from the apparatus, the apparatus being adapted to perform said operations automatically.

A further object is to provide a molding machine of great productive capacity adapted for the forming of large molds and for the handling of large mold flasks with a minimum amount of manual assistance.

In the drawings:

Fig. 12 a transverse section taken through said valve;

Fig. 13 a longitudinal sectional view of the valve;

Fig. 14 a detail section taken on the line 14—14 of Fig. 5;

Referring to the various parts by numerals, 1 designates the base of the apparatus which is preferably mounted upon the bottom of a pit located below the floor 2 of the foundry. The base 1 is in the form of a hollow casting, circular in outline and formed centrally with a central bore which receives the lower end of a column or mast 4 and rigidly supports said mast in a vertical position. Mounted to rotate about the mast 4, just above the base 1, is a turntable or turret 5 formed centrally with a long hub portion 6. The upper end of the hub 6 is recessed to accommodate a ball bearing 7 interposed between the hub and the mast. The boss 3 extends slightly above the body of the casting 1 and the upper end of the boss and the lower end of the hub 6 of the turntable are recessed to accommodate a ball bearing 8 for supporting the turntable.

Figure 1:
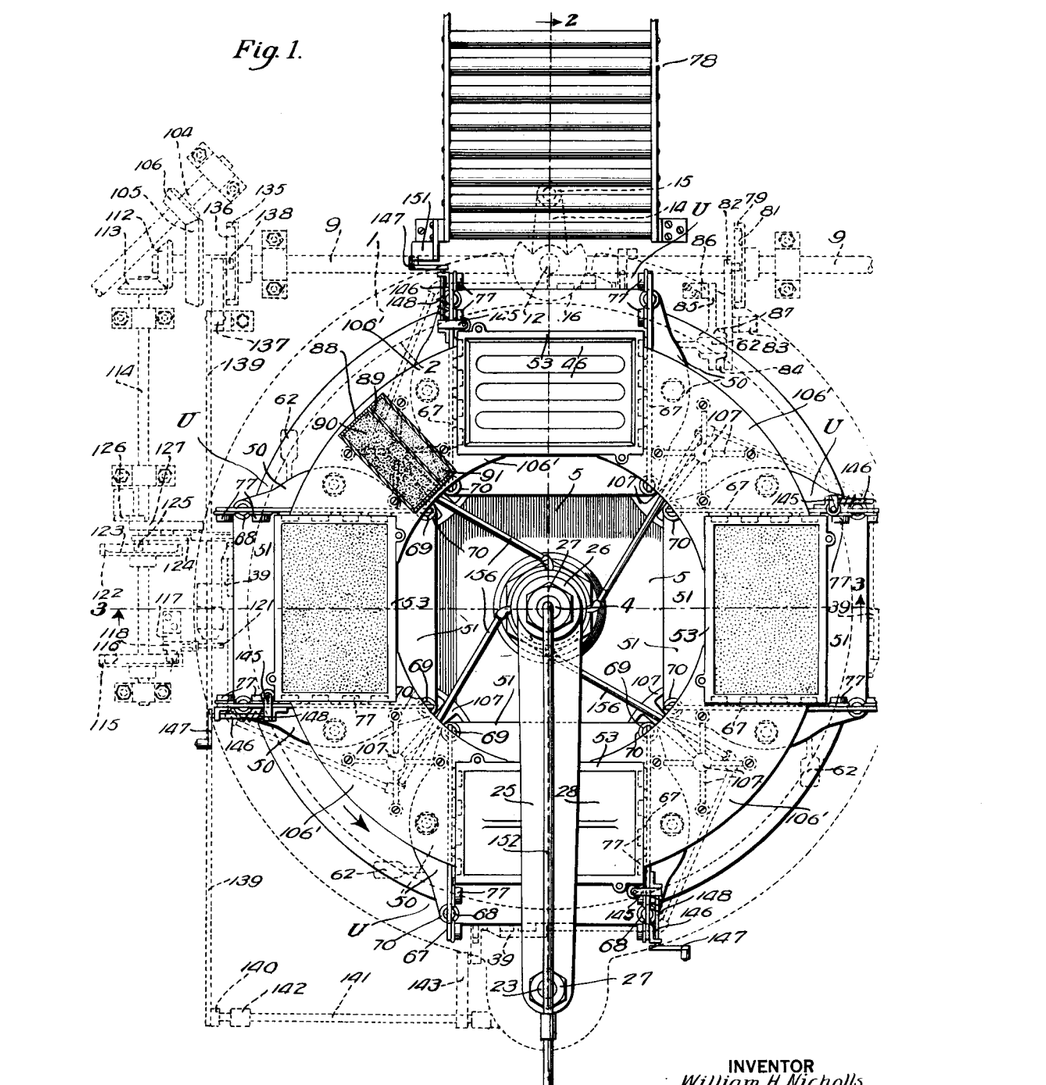
Fig. 1 is a top plan view of the apparatus with parts broken away.
Figure 2:
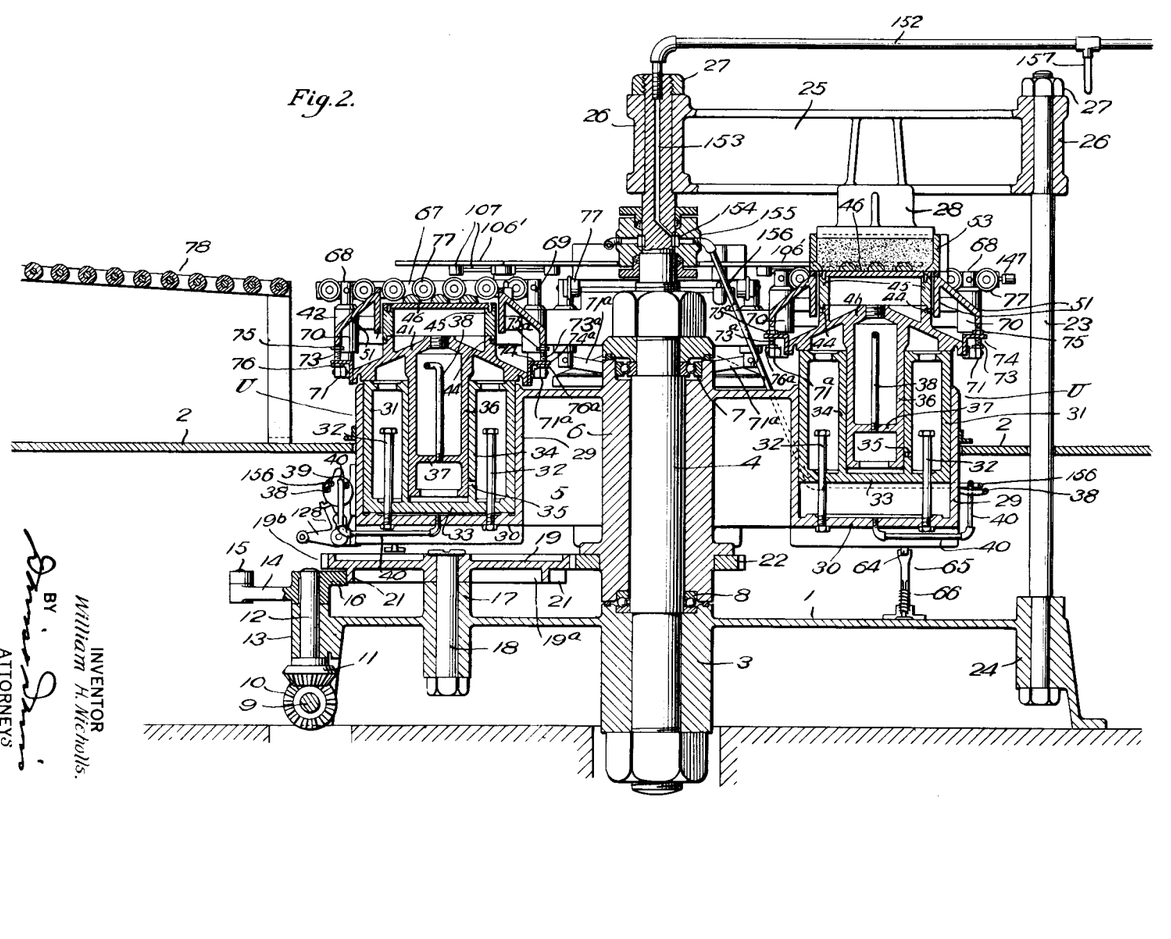
Fig. 2 a vertical section taken on the line 2—2 of Fig. 1.
Figure 5:
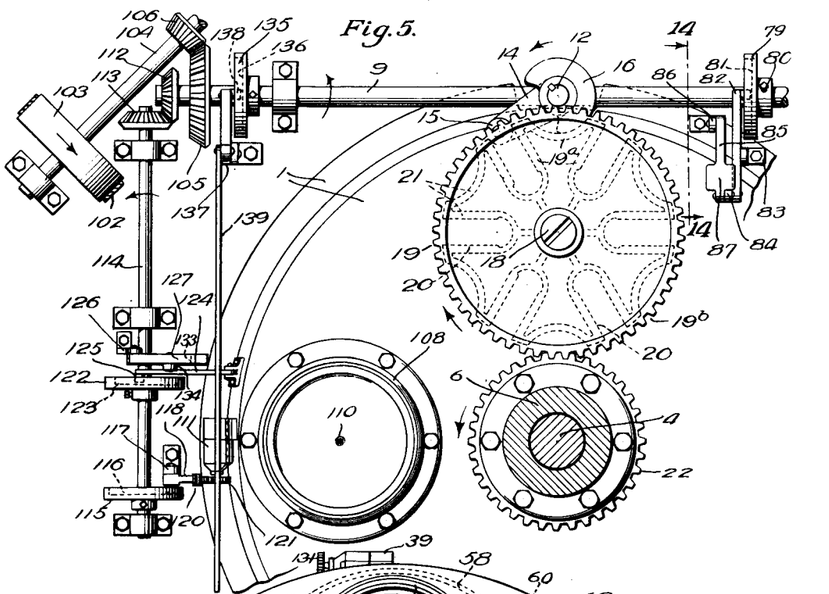
Fig. 5 a plan view of the power driven means for rotating the turntable of the apparatus.
Figure 6:
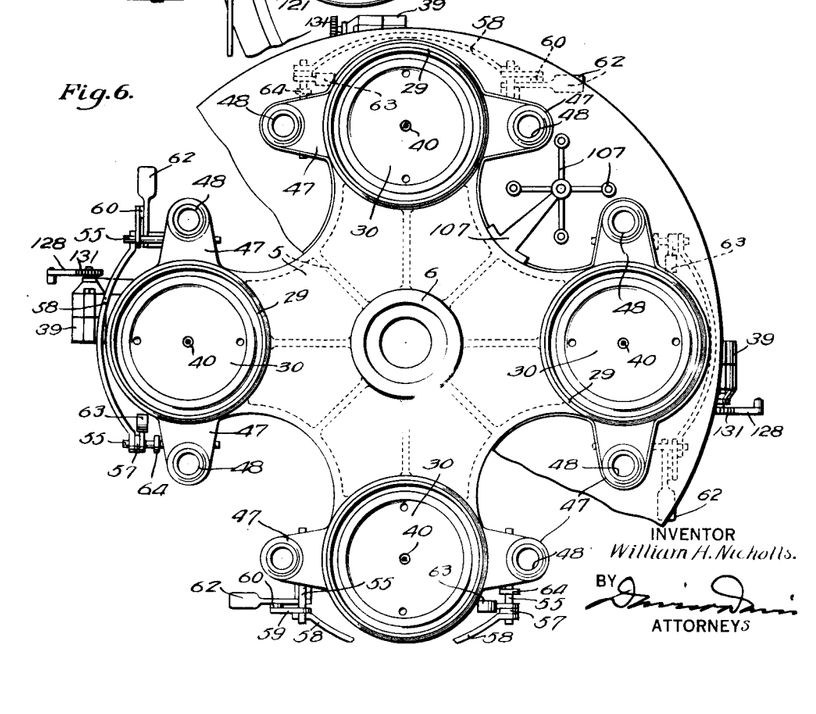
Fig. 6 a plan view of the turntable with parts broken away.

The turntable 5 carries a plurality of mold-forming units U which will be described in detail later in the specification. In the present instance there are four of these units equally spaced, ninety degrees apart, around the axis of the turntable. To perform the different mold-forming operations the units are moved step-by-step in a circular path by rotating the turntable. The turntable is rotated intermittently by means of a Geneva movement shown in Figs. 2 and 5 of the drawings. Included in the Geneva movement is a shaft 9 supported in bearings at one side of the base and adapted to be continuously rotated by a source of power, not shown. Keyed to the shaft 9 is a bevel drive gear 10 which meshes with a gear 11 fixed to the lower end of a short vertical shaft 12. The shaft 12 is journalled within a bearing 13 formed upon one side of the base 1, and the upper end of said shaft has a crank arm 14 keyed upon it. The crank arm carries a roller 15 at its outer end and at its inner or hub end is formed with a segmental locking flange 16. Inwardly of the bearing 13 the base 11 is formed with a boss 17 in which is supported a vertically disposed stub shaft 18. A large, disk-like, combined gear and follower member 19 is mounted to rotate upon the upper end of the shaft 18 and has its periphery formed with gear teeth 19$^b$ and its under face formed with ribs 19$^a$. The ribs 19$^a$ are arranged to define, in the present instance, six equally spaced radial slots 20 adapted to receive the driving roller 15 carried by the crank arm, and also arranged to define six segmental recesses 21 alternating with the slots and designed to receive the segmental locking flange 16 on the hub of the crank arm when the roller is withdrawn from one of the slots 20 to hold the gear against rotation until the roller picks up another slot. This provides a dwell period between each movement of the gear during which period the molding operations are performed. The gear teeth 19$^b$ mesh with a smaller gear 22 fixed to the hub 6 of the turntable so that an intermittent driving connection is provided between the shaft 9 and the turntable. The gears 19 and 22 are so relatively proportioned that the turntable will be given a quarter turn for each one-sixth turn of the gear 19.

At a point diametrically opposite from the location of the Geneva movement a vertical post 23 is rigidly supported at its lower end within a socket 24 formed upon the base 1. This post and the mast 4 extend upwardly a considerable distance above the turntable and at their upper ends support a horizontal beam 25 extending radially out from the mast 4 to the post 23. The beam 25 is formed with sleeve portions 26 at its opposite ends which fit over the upper ends of the mast and the post. These ends are suitably shouldered to support the beam in a horizontal position and are threaded to receive nuts 27 which hold the beam down upon the shoulders. Intermediate its ends the beam 25 rigidly supports a depending pressure head 28 formed with a flat horizontal lower face.

Each of the mold-forming units comprises a mechanism similar to that shown in my copending application Serial No. 10,020 filed February 18, 1925. In the present case the four units U are supported upon the turntable 5 and comprise four equally spaced cylinders 29 preferably cast with the table. Each cylinder is open at its upper end and closed at its lower end by a horizontal wall 30. In the cylinder 29 is fitted a large squeezing piston 31. The upward movement of this squeezing piston is limited by two headed bolts 32 rigidly secured in the bottom wall 30 and extending upwardly through the bottom wall of the squeeze piston. These bolts accurately guide the squeeze piston, and the headed ends thereof limit the upward movement of the piston. The lower end of the squeeze piston is closed by a wall 33 and the upper wall of the piston is provided with openings to permit the escape of air therefrom and also to permit access to the guide bolts 32. A small vertically arranged cylinder 34 is formed on the center and within the squeeze piston, the upper end of this small cylinder being open and the lower end thereof being formed by the bottom wall of the squeeze piston. A short distance above the bottom of this cylinder 34 is formed an exhaust port 35. Mounted in the small cylinder 34 is a jolt piston 36. This piston 36 is provided with a cross wall 37 a short distance upwardly from its lower end. Extending through this cross wall is an air supply pipe 38 which leads out through the upper end of said piston and to an air control valve 39 mounted upon the outer side of the cylinder in a suitable position. An air supply pipe 40 leads from the air control valve into the cylinder 29 below the squeeze piston 18. By properly operating the air control valve air may be admitted under the jolt piston for the jolting operation and then under the squeeze piston for the mold squeezing operation.

Formed integrally with the upper end of the jolt piston is a jolt and squeeze head 41. The lower end of this head is adapted to rest on the upper end of the squeeze piston. Formed on the head 41 are four arms 42 which carry vertically depending tubular sockets 43. On the upper surface of the head 41 are formed upwardly extending vertical flanges 44 which form a horizontal support for a rectangular pattern-plate-supporting frame 45. The said supporting frame may be secured to the head 41 in any suitable manner. The pattern plate 46 is rigidly secured to the upper side of the holding frame in a suitable manner.

Figures 3, 16:
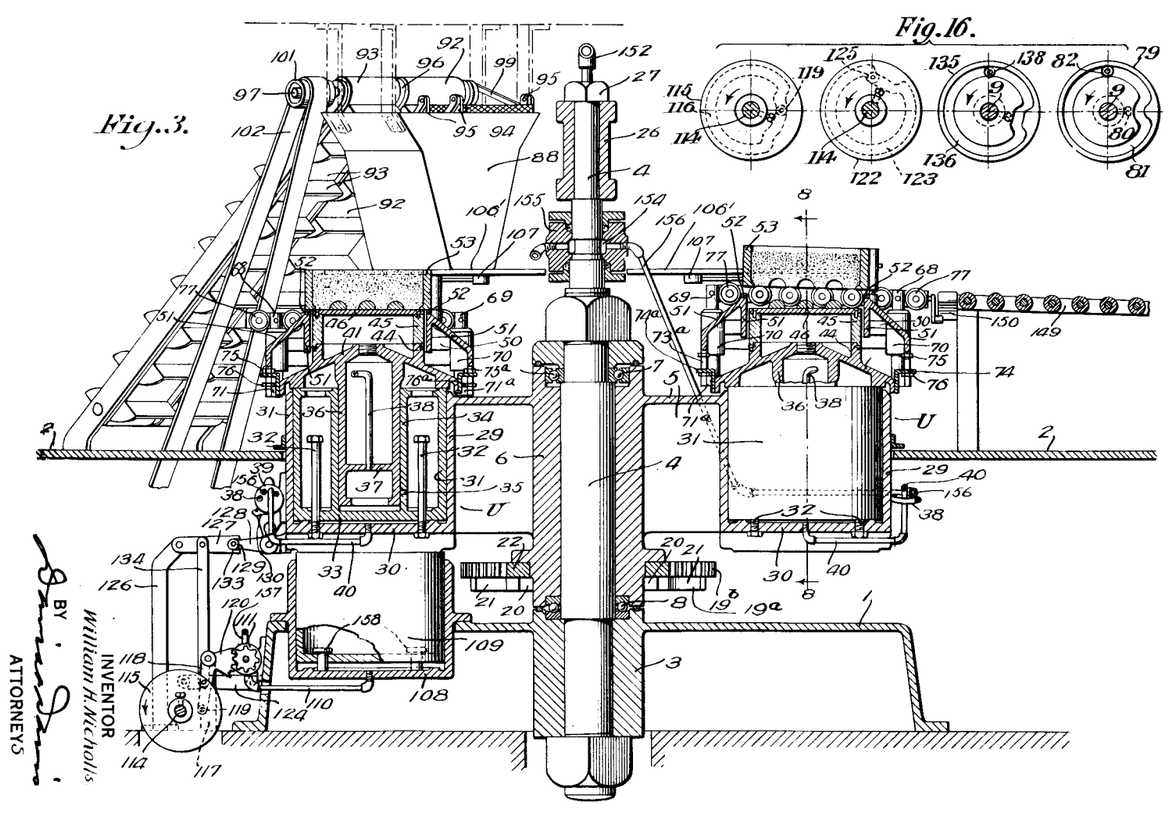
Fig. 3 a vertical section taken on the line 3—3 of Fig. 1.
Fig. 16 a diagrammatic group view of the power-driven cams of the apparatus.
Figure 4:
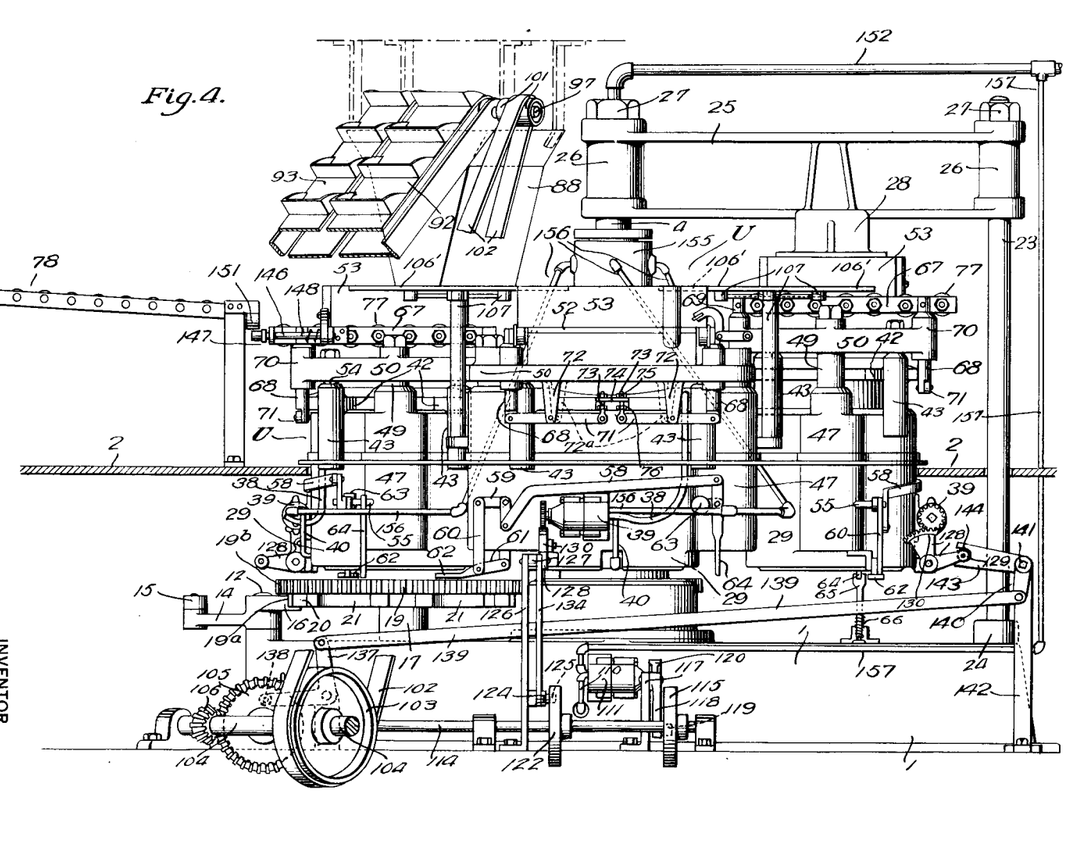
Fig. 4 a side elevation of the apparatus.

Each cylinder 29 is formed at diametrically opposite points with two laterally extending horizontal extensions or arms 47. In these arms 47 are formed vertical sockets 48 in which are mounted vertical plunger rods 49. The upper ends of these rods are connected to the end bars 50 of a flask-supporting frame. The end bars of said frame are connected together at their ends by the inner and outer side bars 51 so that the flask-supporting means is an open rectangular frame having end bars and inner and outer side bars. This flask-supporting frame surrounds the pattern-plate-holding frame and in its normal, or at rest, position is in substantially the same horizontal plane as said holding frame. On the inner and outer side bars of the flask-holding frame are mounted flask-receiving rails 52 said rails being suitably secured in position. The upper surfaces of the rails 52 are flush with the upper surface of the pattern plate when the jolt and squeeze pistons are in their lowermost positions so that when a flask member 53 is placed in position its end walls will rest solely on the upper surface of the pattern plate while its side walls will rest on the rails 52 and also on the upper surface of the pattern plate, as shown in Fig. 3.

The flask-supporting frame is provided at each of its corners with a depending rigid guiding pin 54; and these pins slide in the sockets 43 carried by the head 41. These guide pins assist in accurately guiding the pattern-plate-holding frame during the pattern-drawing operation. When the flask-holding frame is in its lowermost position it rests directly on the upper ends of the sockets 43 so that the said frame will partake of every movement of the jolt and squeeze pistons except during the pattern drawing operation. Guide pins 54 fit accurately in their sockets in order to accurately guide the pattern-holding frame and the flask-holding frame during the pattern-drawing operations. The sockets 48 accurately guide the plunger rods 49 and each socket is enlarged to form an oil chamber.

Figure 7:
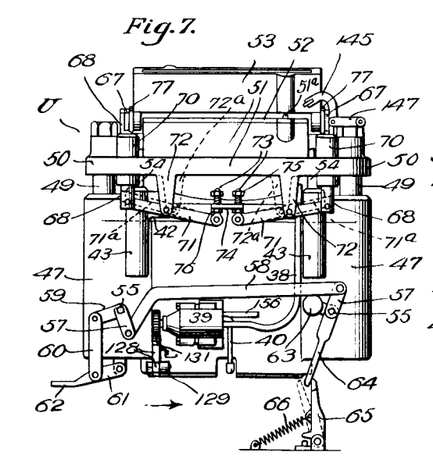
Fig. 7 a front view of one of the mold-forming units.

Extending horizontally through the base and through the lower portions of the sockets 48 are horizontal rock shafts 55, said shafts being adjacent the inner sides of the plunger rods 49. Each rock shaft carries a locking dog 56 which extends upwardly close to the adjacent plunger rod and is adapted to engage a notch in said plunger rod. The rear ends of the rock shafts extend through the base and each carries a crank arm 57, one of said arms extending upwardly and the other downwardly as shown in Fig. 7. The outer ends of these arms are connected together by a link 58 so that said rock shafts 55 will move in unison. The shaft 55 which carries the downwardly extending crank 57 has also an outwardly extending crank arm 59 fixed thereto. The arm 59 is connected by a vertical link 60 to a dog throw-out lever 61 pivoted to the arm 47 below the shaft 55. The lever 61 is disposed substantially parallel to the crank arm 59 and is formed with a free tappet end 62 extending outwardly beyond its link connection. A counter-balance 63 is connected to one of the dog shafts 55 and tends to normally hold the dogs swung away from the rods 49. Secured to the shaft 55 which carries the upwardly extending crank arm 57 is a downwardly extending tappet arm 64. An upstanding arm 65 is pivotally mounted upon the top of the base at a point adjacent the post 23 and has its upper end located in the path of the lower end of the arm 64. In the operation of the apparatus the turntable is turned in a counter-clockwise direction, as viewed in top plan, to bring the flasks successively beneath the stationary pressure head 28. Just before the flask reaches this position the tappet arm 64 is adapted to strike the upstanding arm 65. A tension spring 66 connected to the base 1 and to the arm 64 tends to swing said arm in a reverse direction to the travel of the turntable. As the arms 64 and 65 come into contact, therefore, the arm 64 is swung rearwardly and the shafts 55, cranks 57 and link 58 are moved to the position shown in Fig. 7 to throw both of the dogs against their respective rods 49. The upstanding arm 65 is also moved forward slightly by the arm 64 and the spring 66 is placed under tension. The spring tension holds the dogs yieldingly against the rods 49 so long as the flask remains beneath the pressure head 28.

In order to complete the description of one of the mold forming units the operation of the mechanism for jolting and squeezing the sand, drawing the pattern from the finished mold and lifting the flask from its supporting frame, will be described prior to the introduction of the flask-delivery means and the flask-filling means.

It is assumed that the flask has been placed upon its frame 50—51 and filled with sand. The valve 39 is turned to permit air to pass through pipe 38 to lift the jolt piston, the head 41 and the flask-carrying frame, until the exhaust port 35 is uncovered. The jolting operation is continued until the sand is properly packed around the pattern. After the jolting operation the air valve is operated to supply air through the pipe 40 to the space beneath the squeeze piston. The pressure head 28 is so positioned that when the squeezing operation is completed the locking dogs 56 have been forced into the notches in the plungers 49 by the tension of spring 66, with the upper wall of the notch in each post slightly above the upper end of the dog which is engaged in the notch. When the squeezing operation is completed the air valve is turned to exhaust air from beneath the piston 31. This permits the pistons, the head 41, the pattern-plate-holding frame and the attached pattern plate to drop slightly, together with the flask-supporting frame and flask, until the flask frame is arrested by the engagement of the upper ends of the dogs under the top walls of the notches in post 49, whereupon downward movement of the flask and flask frame ceases, with the pressure on the mold relieved and the upper edges of the flask below the level of the head 28, while the pistons, head 41, pattern plate and pattern continue to descend to draw the pattern from the mold. The pattern-plate-holding frame and the pattern-plate are guided in their downward movement by the four guide pins 54 and by the squeeze piston 31 moving downwardly in the cylinder 29. When the pattern-drawing operation is complete the pattern is freed from the mold and the flask is supported above the pattern and is ready to be removed.

Figure 8:
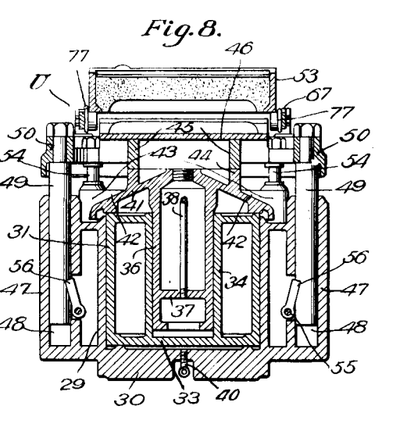
Fig. 8 a sectional view of one of the mold-forming units taken on the line 8—8 of Fig. 3.

Means are provided for automatically lifting the flask from the flask-holding frame, consisting of a pair of parallel lifting and conveyor bars 67 overlying the end bars 50 of the flask-holding frame in planes slightly outside of and parallel with the ends of the flask 53 and close to the ends of the flask-receiving rails 52. Each bar 67 is pivotally mounted at its ends in the slotted upper ends of depending vertically reciprocating rods 68 and 69. These rods are guided in depending tubular guides 70 carried by the flask-supporting frame at the corners thereof. In the normal at-rest position of the bars 67 they rest directly on the upper ends of the tubular sockets 70. In this position of the bars they are below the lower edges of the flask walls and below the upper surfaces of the flask-supporting rails and the upper surface of the pattern plate 46. The lower ends of the forward pair of rods 68 are pivotally connected to the outer ends of inwardly extending levers 71. Each of these levers is pivoted on the lower end of a depending lug 72 carried by the flask-supporting frame. The inner end of each of the levers 71 pivotally supports an upwardly extending pin 73, said pins extending loosely through apertures in an operating lug 74 rigidly secured to the outer marginal edge of the jolt and squeeze piston head 41. The pins 73 are provided with adjustable nuts or stop collars 75 and 76 spaced above and below the lug 74 so that the lug has a lost-motion connection with the pins. The lug 74 engages the stops 75 and 76 in the operation of the jolt piston. The lower ends of the inner pair of rods 69 are pivotally connected to the outer ends of levers 71ª. The levers 71ª are pivoted to the lower ends of depending lugs 72ª carried by the flask-supporting frame on the opposite side thereof from the lugs 72. The inner ends of the levers 71ª are connected to vertically extending pins 73ª carrying adjustable stops 75ª and 76ª, and operating through a lug 74ª in the same manner as the pins 73. The pins and lug of the levers 71ª operate precisely as the corresponding pins and lug of the levers 71. The pivotal points between the levers 71ª and the lugs 72ª are somewhat further from the reciprocating rods 69 than are the pivotal points between the levers 71 and the lugs 72 to the rods 68. The purpose of this is to obtain a slightly greater upward movement of the rods 69 so that the inner ends of the conveyor bars or tracks 67 will be raised slightly higher than the forward ends thereof. Each of the bars 67 carries on its inner side a series of flanged rollers 77 which are arranged directly under the adjacent side edges of the flask and are adapted to be moved upwardly into engagement with them, as shown in Fig. 8. The side edges of the flask extend slightly beyond the pattern plate in order that the rollers 77 may be moved upwardly directly into contact with the flask in order to lift it. The rear ends of the track bars 67 are raised higher than the forward ends thereof in order to incline the trackway downwardly and outwardly to permit the flasks to roll readily from the bars.

The operation of the flask-lifting mechanism is as follows:

After the jolting operation the squeeze piston is forced upwardly for the squeezing operation and carries with it the jolting and squeezing head, the pattern plate, the flask-holding frame and the flask. The flask-discharging conveyor and its tilting mechanism move upwardly with the flask-supporting frame during the jolting operation and all of this mechanism moves together and there is no relative movement between the bars 67 and the flask-supporting frame. During the squeezing operation the bars 67 remain in idle position below the lower edge of the flask. After the squeezing operation the spring 66, acting through its various crank-arm-and-link connections, throws the locking dogs 56 into engagement with the notches in the plungers 49 to thereby lock up the flask-holding frame and permit the jolt and squeeze pistons and the pattern plate to move downwardly to draw the pattern from the flask and mold. After the pattern has been drawn from the mold the lugs 74 and 74ª, carried by the head of the jolt piston, will engage the lower stop collars 76 and 76ª on pins 73 and 73ª and force downwardly the inner ends of the levers 71 and 71ª. As the pivot lugs 72 and 72ª of levers 71 and 71ª are locked up and held stationary by the dogs 56 engaging the notches in the plungers 49, the outer ends of the levers 71 and 71ª will be forced upwardly thereby moving upwardly the rods 68 and 69 and bars 67. The upward movement of these rods will carry the bars 67 upwardly and bring the rollers 77 on said bars into engagement with the lower edges of the sides of the flask. The continued downward movement of the jolt piston will force the flask upwardly, lifting it away from the pattern plate and above the usual guide pins 51ª as shown in Fig. 7. Owing to the arrangement of the pivots of the levers 71 and 71ª the inner ends of the roller-carrying bars will be raised slightly higher than the forward ends.

If for any reason the rods 68 and 69 stick in their sockets so that the conveyor bars 67 do not drop down to, and rest upon, the upper edges of the sockets of said rods, the downward movement of the flask-holding frame (when the latch dogs 56 are released, as hereinafter described) will carry the levers 71 and 71ª downwardly and bring the upper stops 75 and 75ª into engagement with the lugs 74 and 74ª. The lugs 74 and 74ª at this time are stationary; as a result, the rods 68 and 69 will be pulled downwardly in their sockets to bring the bars 67 to their lowermost positions. The upper stop collars 75 and 75ª are properly adjusted on their pins to ensure the track bars 67 returning to their normal, lower, at-rest position when the flask-holding frame is lowered. By varying the position of the lower stops 76 and 76ª, the extent of upward movement of the rods 68 and 69 may be varied. It is manifest, therefore, that the inner ends of the bars 67 may be given a slightly greater upward movement than the outer ends of said bars by so adjusting the stop collars 76ª on the pins 73ª carried by the levers 71ª that they will be engaged by lug 74ª slightly before the lug 74 at the front of the machine engages the stop collars 76 on pins 73 to lift the outer ends of the track bars.

A downwardly and inwardly inclined roller conveyor 78 is mounted upon the foundry floor 2 with its delivery end adjacent the turn-table at a point located diametrically opposite from the pressure head 28 and its supporting members. During the travel of one of the mold-forming units from its position beneath the pressure head 28 to its position adjacent the conveyor 78 by the rotation of the turntable, the flask-holding frame 51 and the track 67 are held in their elevated positions by the lock-up dogs 56. When the unit reaches its latter position the outer ends of the track bars are in alignment with the delivery end of the conveyor 78. The flask containing the finished mold is removed before the unit arrives at the conveyor 78 so that an empty flask may be rolled from the conveyor directly on to rollers 77 carried by the track bars 67. This delivery of the empty flask is accomplished during the early part of the dwell period of the turntable as determined by the Geneva movement. Before the end of this dwell period the dogs 56 are automatically thrown out of engagement with the supporting plungers 49 to permit the flask-supporting frame and the track bars 67 to gravitate to normal position and lower the empty flask into position upon the supporting rails 52. In order to effect this automatic dog throw-out a disc cam 79 is secured upon the drive shaft 9. This cam is adjustably held to the shaft by a set screw 80 and is formed with cam groove 81 in one face. A horizontal lever 82 is pivoted intermediate its ends upon a bracket 83 mounted upon the base 1 and carries a roller at one end adapted to engage in the cam groove 81. The opposite end of the lever is connected by a link 84 to one end of a substantially horizontal rock arm 85 located directly over the lever. The arm 85 is pivoted at its opposite end upon a standard 86 supported by the base 1, and is formed with a tappet portion 87 so located that when the mold-forming unit is in its flask-receiving position, said tappet portion will lie directly beneath the tappet end 62 of the dog throw-out lever 61. The cam 79 is so formed and so adjusted upon the shaft with relation to the Geneva movement, that just before the end of the dwell period the lever 82 and its connected rock arm 85 will be operated to elevate the tappet portion 87 against the under side of the dog throw-out lever 61 and rock it upwardly. This operation of the lever 61 will move its link connections to throw the dogs 56 away from the plungers 49 and permit the flask-supporting parts to drop, the bars 67 returning to their normal horizontal position, heretofore described, and leaving the flask supported upon the rails 52 of the flask-supporting frame 50—51.

After the flask has been delivered to the track rollers 77 and then lowered upon its supporting rails, at the end of the dwell period, the Geneva movement rotates the turn-table ninety degrees in a counter-clockwise direction to carry the flask to its jolt position. In the course of its travel to this position the flask is automatically filled with sand. For this purpose a delivery hopper 88 is located over the path of the flask between its flask-receiving position and its jolt position. The hopper may be supported in any suitable manner. The side walls of the hopper converge downwardly and said hopper is divided by a vertical partition 89 into a large chamber 90 and a smaller chamber 91. The lower or delivery ends of both chambers are open. Leading upwardly to the upper end of the large chamber 90 is an endless sand conveyor 92 which delivers sand to said chamber. A smaller endless conveyor 93 is disposed alongside of the conveyor 92 and is adapted to deliver sand to the chamber 91. Mounted within the upper end of the smaller chamber 91 to receive the sand from the conveyor 93 is a tray-shaped sand riddle 94. This riddle is supported by links 95 suspended from brackets mounted upon the upper edges of the hopper and is adapted to be vibrated back and forth. The conveyors 92 and 93 are trained over a drum 96 fixed to a shaft 97 rotatably mounted at the upper end of the hopper. One end of the drum shaft has an eccentric connection 98 with one end of a pitman 99. The other end of the pitman has a crank connection 100 with one of the links 95 supporting the riddle. Upon the opposite end of the drum shaft 97 is fixed a pulley 101 which is driven by a belt 102. This belt extends downwardly through openings in the foundry floor 2 and is trained about a drive pulley 102. The pulley 103 is fixed to a shaft 104. This shaft is driven by a bevel gear 105 keyed to the main drive shaft 9 and meshing with a bevel pinion 106 fixed to the pulley shaft 104. The main shaft is continuously rotated and the conveyors 92 and 93 will therefore be continuously driven by the belt 102. The riddle 94 will also be continuously vibrated by its operative connection with the conveyor drum 96.

Figures 9, 10:
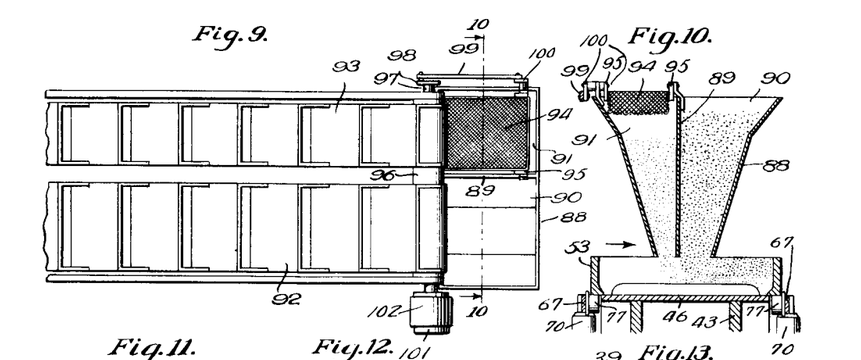
Fig. 9 a plan view of the sand-delivery hopper and the conveyors leading to it.
Fig. 10 a vertical section taken on the line 10—10 of Fig. 9.
Figures 11, 15:
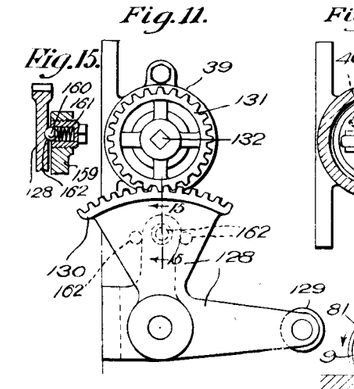
Fig. 11 an end view of an air valve and its operating lever, detached from one of the mold-forming units.
Fig. 15 a detail section taken on the line 15—15 of Fig. 11.

The smaller chamber 91 of the hopper 88 is filled by the conveyor 93 with sand which has been carefully prepared for molding, while the larger chamber 90 is filled by the conveyor 92 with sand which has been less carefully prepared. The discharge opening of the smaller chamber is more restricted than that of the larger chamber and is located in advance thereof with relation to the movement of the flask as the turntable is rotated. The flask will therefore pass under the smaller opening of the hopper first and the patterns at the bottom of the flask will be covered with the finely prepared sand from the smaller chamber 91, as shown in Fig. 10 of the drawings. The remaining depth of the flask is filled with the sand from the larger chamber 90 of the hopper. The portion of the flask in which the mold is formed is thus provided with fine facing sand while the remaining portion is filled with backing sand less carefully prepared. This effects an economy in the labor of preparing the sand. The lower end of the hopper is substantially flush with the upper edges of the flask and its discharge openings are substantially equal to the flask in width. The flasks will therefore be filled with sand which will be leveled off flush with the upper edges of the flask by the scraping action of the lower edges of the hopper. The riddle 94 finely divides the sand entering the chamber 91 so that it will not choke the restricted opening at the lower end of the chamber.

Extending between each pair of mold-forming units U is a flat shield plate 106′ having a substantially arcuate contour in plan. These plates are rigidly supported by brackets 107 mounted upon the turntable at points between the mold-forming units. The width of the plates is sufficient to cover the delivery openings of the sand hopper and they are supported with their upper surfaces flush with the edges of the flasks when the said flasks are in their lowermost positions upon the mold-forming units. The purpose of the plates is to move under the discharge openings of the hopper and close them when a flask passes out from under the hopper. Each plate is formed at its ends to snugly fit the ends of the adjacent flasks and prevent sand from escaping past the ends of the flask as it is moved from under the hopper.

When the Geneva movement has rotated the turntable through ninety degrees and moved the sand-filled flask to its jolt position, said Geneva movement holds the turntable for another dwell period. In order to prevent jarring of the entire turntable and to prevent a strain at its axial bearings during the jolting operation provision is made for supporting the mold-forming unit during said operation. A large centrally arranged cylinder 108 is mounted upon the base 1 at a point directly beneath the cylinder 29 of a mold-forming unit when said unit is in its jolt position. The lower end of the cylinder 108 is closed and its upper end is open. Fitted within the cylinder to reciprocate vertically is a large piston 109. A pipe 110 leads from the space below said piston to an air valve 111 mounted upon the outer side of the base 1. At the early part of the dwell period and before the jolting operation commences, the valve 111 is adapted to be automatically operated to admit compressed air to the space beneath the piston 109 and cause it to be forced up into contact with the bottom 30 of the cylinder 29 and support the mold-forming unit during the jolting.

The valve 111 is automatically operated by power from the main shaft 9. Fixed to one end of the shaft 9 is a bevel gear 112 which meshes with a gear 113 fixed to a shaft 114 supported by bearings at one side of the base and extending at right angles to the shaft 9 to a point adjacent the valve 111. A cam disc 115 is adjustably mounted upon the end of the shaft 114 adjacent the valve and is formed at one face with a cam groove 116. Pivotally mounted upon a standard 117 adjacent the cam is a valve-operating lever 118 formed with a depending arm carrying a roller 119 adapted to engage in the cam groove, and a lateral arm formed with a toothed segment 120. The toothed segment meshes with a gear 121 fixed to one end of the stem of the valve 111. This valve is adapted to admit air to the cylinder 108 when its stem is turned in one direction and to exhaust air from the cylinder when the stem is turned in the opposite direction. The cam 115 is so formed and adjusted upon its shaft as to cause the rocking of the lever 118 and the operation of the valve to admit air before the beginning of the jolting operation and exhaust it at the conclusion of said operation. When the air is exhausted from the cylinder 108 the piston drops down clear of the cylinder 29.

At the proper time within the dwell period, the valve 39 carried by the cylinder 29 is automatically operated to admit air below the jolt piston and cause the jolting operation previously described. This valve is automatically operated by a cam disc 122 adjustably mounted upon the shaft 114 and formed at one face with a cam groove 123. Pivoted at one end to the base 1 and extending outwardly from it is a lever 124. At its outer end the lever 124 carries a roller 125 which engages in the cam groove 123. A standard 126 is located adjacent the cam and has a lever 127 pivoted upon its upper end and extending inwardly toward valve 39. Pivotally mounted upon the cylinder 29 below the valve 39 is a valve-operating lever 128 formed with a laterally extending arm carrying a roller 129 and an upwardly extending arm in the form of a toothed segment 130. The toothed segment meshes with a gear 131 fixed to the stem 132 of the valve 39. The inner end of the lever 127 is forked as at 133 and is adapted to receive the roller 129 carried by the lever 128. The levers 127 and 124 are operatively connected together intermediate their ends by a vertical link 134. The fork 133 normally lies within the path of the roller 129 as said roller is carried around with the turntable, and said fork is so located as to receive and straddle the roller when the mold-forming unit carrying the roller is moved into its jolt station. Thus an automatic operative connection between the cam 122 and the valve 39 is effected through the various levers and the link 134. The cam is so formed and so adjusted upon the shaft 114 as to open and close the valve 39 to properly time the beginning of the jolting operation and its duration with relation to the other operations which take place around the turntable during the dwell period.

At the conclusion of the dwell period the turntable is given another quarter turn by the Geneva movement and the jolted flask is carried around to its squeeze position beneath the pressure head 28. It is held here during another dwell period. During this period the valve 39 is automatically operated to effect the mold squeezing, pattern-drawing and flask-lifting operations previously described. The valve 39 also is operated by power taken from the main shaft 9. Adjustably mounted upon the shaft 9 adjacent the bevel gear 105 is a cam disc 135 formed in one face with a cam groove 136. Pivotally mounted upon a standard adjacent the cam is a lever 137 formed with a lateral arm and a vertical arm. The lateral arm of the lever carries a roller 138 which engages in the cam groove 136, and the vertical arm has a reach rod 139 connected to it and extending past the base 1 to a point adjacent the squeeze position. At this point the reach rod is connected to a crank arm 140 fixed to one end of a rock shaft 141. This shaft is mounted upon standards 142 and extends inwardly transversely from the reach rod to a point adjacent the valve 39 located at the squeeze position. Fixed to the shaft 141 and extending inwardly toward the valve is a lateral arm 143 formed with a fork 144 at its inner end. This fork is normally located to receive the roller 129 on the valve operating lever 128 of the molding unit which is located at the squeeze position and thus effect an operative connection with the valve. The came 135 is formed and adjusted to operate the valve, through the connections just described, to admit air below the squeeze piston and exhaust it therefrom as previously described and effect the squeezing of the mold, the drawing of the pattern and the elevation of the flask above its supporting frame by the track bars 67 at the proper time during the dwell period.

At the end of this dwell period the Geneva movement moves the turntable another quarter turn and the flask with its completed mold is carried to the position at which it is discharged or conveyed away from the turntable. The flask conveyor bars 67 remain in their elevated and inclined positions owing to the fact that the lock-up dogs 56 were tripped into their operative positions by the levers 64 and 65 as the molding unit is moved into its squeeze position. The flask is thus carried around from the squeeze station to the delivery station in a position elevated above its supporting frame and downwardly and outwardly inclined. In order to prevent the flask from rolling from the track bars during this movement a retaining device is mounted upon one of the track bars adjacent its outer end. This device comprises a rock arm 145 fixed to the inner end of a short rock shaft 146 extending along the outer side of the bar 67 and pivotally mounted thereon by brackets. Fixed to the outer end of the shaft 146 is a lateral trip arm 147 which extends outwardly and carries a roller at its outer end. The flask retaining arm 145 is adapted to swing transversely of the track bars and across the front of the flask. The inner end of the arm carries a roller which contacts the outer wall of the flask and holds it against outward movement. A spring 148 tends to hold the arm 145 in its flask-holding position.

A roller conveyor 149 is supported upon the foundry floor 2 at the flask-discharge station and in alinement with the track bars 67. This conveyor leads away from the track bars and is inclined slightly outwardly and downwardly. At its inner end the conveyor is provided with a downwardly and laterally inclined cam member 150. The roller carried by the trip arm 147 of the flask-retaining device is adapted to come into contact with the under face of the cam member 150 when the track bars move into alinement with the conveyor and be automatically moved downwardly to rock and hold the retaining arm clear of the flask as the molding unit comes to rest in that dwell position of the unit in which the unit is in register with the conveyor 149. The flask is then free to roll laterally off of the track bars 67 and onto the conveyor 149 for delivery away from the turntable during the dwell period. At the end of the dwell period the turntable is again moved, the roller on arm 147 passing out from under cam 150, and the track bars from which the flask has been automatically discharged are carried around into alinement with the conveyor 78 over which the empty flasks are delivered to the molding units. This conveyor is provided with a cam member 151, similar to the cam 150. The cam 151 is also adapted to rock and hold the flask retaining device out of the way during the dwell of a molding unit at the flask-supplying point and permit an empty flask to be rolled upon the track bars 67 of the unit.

There is an operation performed at each of the four stations around the turntable during each dwell period. At the first station an empty flask is placed upon the track bars 67. At the second station a filled flask is automatically jolted. At the third station the mold-squeezing and pattern-drawing operations are automatically performed and at the fourth station a flask containing a completed mold is delivered away from the turntable.

The compressed air for pneumatically operating the mold-forming units is conducted to the apparatus by a pipe 152 which leads from an air compressor, not shown. The pipe 152 is connected to the upper end of the mast 4 and leads into a vertical bore 153 formed in the mast. The lower end of this bore is formed with a lateral branch which leads into an annular chamber 154 surrounding the mast and formed by a stuffing-box structure 155. The stuffing-box structure is adapted to rotate upon the mast along with the turntable and has four branch pipes 156 leading from it. Each of the pipes leads to one of the four valves 39 carried by the mold-forming units and supplies air to said valves. The valve 111 which controls the operation of the supporting piston 109 is supplied with air by a branch pipe 157 which leads downwardly from the main supply pipe 152 to said valve.

It is desirable that the jolting operation should occur at a time when there are no finished molds supported by the turntable. This is in order to avoid possible injury to the mold by the jolt vibrations. The valve-operating cams 122 and 135 are therefore so adjusted with relation to each other as to properly time the various operations and protect the molds from injury. To this end the cam 122 is adjusted to delay the beginning of the jolt operation at the early part of the dwell until a flask at the opposite side of the turntable containing a finished mold has had time to roll from the inclined rails 67 and out upon the roller conveyor 149 clear of the turntable. The cam 122 then causes the jolting operation. At the conclusion of the jolt the cam 135 causes the squeezing and pattern-drawing operations. The cam 135 is adjusted to delay these operations until the jolt is entirely finished. The jolt, therefore, occurs between the removal of a finished mold and the forming of another mold and both of said molds avoid the jolt vibrations. The cams 115 and 122 are so relatively adjusted upon the shaft 114 that the cam 115 will admit air to the cylinder 108 to raise the supporting piston 109 into operative position before the cam 122 operates the valve 39 to commence the jolt. At the conclusion of the jolt operation as determined by the cam 122 the cam 115 operates the valve 111 to exhaust the air from the cylinder 108 and permit the return of the piston 109. Suitable stops 158 are provided to prevent the piston 109 from moving up too far and imposing an undue strain upon the turntable. The valve 111 is operated to exhaust air from the cylinder 108 before the cam 135 causes the squeeze operation. This is in order to relieve the turntable of the upward pressure exerted by the piston 109 before the squeezing and drawing operations take place. In Fig. 16 the forms of the four cams and their relative adjustments, necessary to cause the various operations in the sequence stated, are diagrammatically shown. This view shows the positions of the cams at the beginning of a jolt operation, the cams 115 and 122 having operated their connected valves to first admit air to the cylinder 108 and next to the jolt cylinder 34. The drive shaft 12 of the Geneva movement and the cam shafts 9 and 114 are all geared together to turn at the same rate of speed.

The valve 39 of each unit is yieldably held against accidental operation or displacement from an adjusted position by a detent device carried by a fixed arm 159 at one side of the segment 130 and comprising a ball 160 pressed outwardly by a spring 161. The ball is adapted to snap into any one of three cavities 162 formed in the segment arm of the lever 128 and suitably spaced for the jolt, squeeze, and neutral positions of the segment.

What I claim is:

1. A foundry apparatus comprising a support for a mold-flask and pattern mounted to be moved to carry said flask in a circular path; power driven means to move said support; means to automatically fill said flask during a portion of its travel around said circular path; means to jolt the sand within the flask; means operated by said power driven means to automatically operate said jolt means when the flask has been carried to one position in its circular path; means adapted to be automatically operated by said power driven means to squeeze the sand within the flask to form the mold and to draw the pattern from the mold when the flask has reached another point in its path; and conveyor means adapted to automatically deliver the flask laterally away from the support when it has been carried to still another point in its path.

2. A foundry apparatus comprising a support for a mold flask and pattern mounted to be moved to carry said flask in a circular path; power driven means to move said support; means to jolt the sand within the flask; means operated by said power driven means adapted to automatically operate said jolt means when the flask has been carried to one position in its circular path; means adapted to be automatically operated by said power driven means to squeeze the sand within the flask to form the mold and to draw the pattern from the mold when the flask has reached another point in its path; and conveyor means to automatically deliver the flask laterally away from the support when it has been carried to still another point in its path.

3. A foundry apparatus comprising a support for a mold flask and pattern mounted to be moved to carry said flask in a circular path; power driven means to move said support; means to automatically fill said flask during a portion of its travel around said circular path; means to jolt the sand within the flask; means to automatically operate said jolt means when the flask has been carried to one position in its circular path; means to automatically squeeze the sand within the flask to form the mold and draw the pattern from the mold when the flask has reached another point in its path; and conveyor means to automatically deliver the flask laterally away from the support when it has been carried to still another point in its path.

4. A foundry apparatus comprising a support for a mold flask and pattern mounted to be moved to carry said flask along a definite path; means to automatically fill said flask during a portion of its travel along its path; means to automatically jolt the sand within the flask when the flask has been carried to one position in its path; means to automatically squeeze the sand within the flask to form the mold and draw the pattern from the mold when the flask has reached another point in its path; means to automatically deliver the flask laterally away from the support when it has been carried to still another point in its path; and power driven means to intermittently and automatically move the flask support to carry the flask to said points successively.

5. A foundry apparatus comprising a turntable adapted to support a plurality of mold flasks and patterns at spaced points around its axis; power driven means adapted to rotate said turntable intermittently and move the flasks in a circular path by steps equal to the spaces between the flasks; means to automatically fill each flask with sand during a portion of its travel; means to automatically jolt the sand in each flask at one point in its circular path; means to automatically squeeze the sand in each flask and draw the pattern therefrom at another point in its path; and conveyor means to deliver each flask laterally away from the turntable at still another point in its path.

6. A foundry apparatus comprising a rotatably mounted turret; a plurality of mold-forming units carried by said turret and spaced around its axis of rotation, each unit being adapted to support a mold flask and pattern and comprising means adapted to be operated to jolt the flask, and means adapted to be operated to squeeze sand within the flask and draw the pattern from the mold; means to automatically fill each flask with sand during a portion of its movement around the axis of the turret as the turret is rotated; power driven means to rotate the turret step-by-step; means operated by said power driven means to automatically operate said jolt means of each unit when the unit has reached one point in its path around the axis of the turret; means operated by said power driven means to automatically operate said squeezing and pattern drawing means of each unit when the unit has reached another point in its path; and means to automatically deliver the flask laterally away from each unit when the unit has reached still another point in its path.

7. A foundry apparatus comprising a rotatably mounted turret; a plurality of mold-forming units carried by said turret and spaced around its axis of rotation, each unit being adapted to support a mold flask and pattern and comprising means adapted to be operated to jolt the flask, and means adapted to be operated to squeeze sand within the flask and draw the pattern from the mold; means to automatically fill each flask with sand during a portion of its movement around the axis of the turret as the turret is rotated; power driven means to rotate the turret step-by-step; means to operate said jolt means of each unit when the unit has reached one point in its path around the axis of the turret; means to operate said squeezing and pattern drawing means of each unit when the unit has reached another point in its path; and means to automatically deliver the flask laterally away from each unit when the unit has reached still another point in its path.

8. A foundry apparatus comprising a rotatably mounted turret; a plurality of mold-forming units carried by said turret and spaced around its axis of rotation, each unit being adapted to support a mold flask and pattern and comprising means adapted to be operated to jolt the flask, and means adapted to be operated to squeeze sand within the flask and draw the pattern from the mold; means to automatically fill each flask with sand during a portion of its movement around the axis of the turret as the turret is rotated; means to rotate the turret step-by-step; means to operate said jolt means of each unit when the unit has reached one point in its path around the axis of the turret; and means to operate said squeezing and pattern drawing means of each unit when the unit has reached another point in its path.

9. A foundry apparatus comprising a rotatably mounted turret; a plurality of mold-forming units carried by said turret and spaced around its axis of rotation, each unit being adapted to support a mold flask and pattern and comprising means adapted to be operated to jolt the flask, and means adapted to be operated to squeeze sand within the flask and draw the pattern from the mold; means to rotate the turret step-by-step; means to operate said jolt means of each unit when the unit has reached one point in its path around the axis of the turret; means to operate said squeezing and pattern-drawing means of each unit when the unit has reached another point in its path; and means to automatically deliver the flask laterally away from each unit when the unit has reached still another point in its path.

10. A foundry apparatus comprising a rotatably mounted turret; a plurality of mold-forming units carried by said turret and spaced around its axis of rotation, each unit being adapted to support a mold flask and pattern and comprising means adapted to be operated to jolt the flask, and means adapted to be operated to squeeze sand within the flask and draw the pattern from the mold; means to automatically fill each flask with sand during a portion of its movement around the axis of the turret as the turret is rotated; and means to operate said squeezing and pattern-drawing means of each unit when the unit has reached one point in its path.

11. A foundry apparatus comprising a rotatably mounted turret; a plurality of mold-forming units carried by said turret and spaced around its axis of rotation, each unit being adapted to support a mold flask and pattern and comprising means adapted to be operated to jolt the flask, and means adapted to be operated to squeeze sand within the flask and draw the pattern from the mold; means to operate said squeezing and pattern-drawing means of each unit when the unit has reached one point in its path; and means to automatically deliver the flask laterally away from each unit when the unit has reached another point in its path.

12. A foundry apparatus comprising a rotatably mounted turret; a plurality of mold-forming units carried by said turret and spaced around its axis of rotation, each unit being adapted to support a mold flask and pattern and comprising means adapted to be operated to jolt the flask, and means adapted to be operated to squeeze sand within the flask and draw the pattern from the mold; means to automatically charge each flask with sand at a position in its path around the axis of the turret; and means to operate said squeezing and pattern drawing means of each unit when the unit has reached one point in its path.

13. A foundry apparatus comprising a rotatably mounted turret; a plurality of mold-forming units carried by said turret and spaced around its axis of rotation each unit being adapted to support a mold flask and pattern to travel with it around the axis and including means adapted to be operated to squeeze sand within the flask to form the mold; means to automatically charge each flask with sand at a position in its path around the axis of the turret; means to operate said squeezing means of each unit when the unit has reached one point in its path; and means to automatically deliver the flask laterally away from each unit when the unit has reached another point in its path.

14. A foundry apparatus comprising a rotatably mounted turret; a plurality of mold-forming units carried by said turret and spaced around its axis of rotation, each unit being adapted to support a mold flask and pattern and comprising means adapted to be operated to jolt the flask, and means adapted to be operated to squeeze sand within the flask and draw the pattern from the mold; means to operate said jolt means of each unit when the unit has reached one point in its path around the axis of the turret; and means to operate said squeezing and pattern drawing means of each unit when the unit has reached another point in its path.

15. A foundry apparatus comprising a rotatably mounted turret; a plurality of mold-forming units carried by said turret and spaced around its axis of rotation, each unit being adapted to support a mold flask and pattern and comprising means adapted to be operated to jolt the flask, and means adapted to be operated to squeeze sand within the flask and draw the pattern from the mold; means to operate said jolt means of each unit when the unit has been carried by rotation of the turret to one point in its path around the axis of the turret; and means to operate said squeezing and pattern-drawing means of each unit when the unit has reached another point in its path.

16. A foundry apparatus comprising a rotatably mounted turret; a plurality of mold-forming units carried by said turret and spaced around its axis of rotation, each unit being adapted to support a mold flask and pattern and comprising means adapted to be operated to jolt the flask, and means adapted to be operated to squeeze sand within the flask and draw the pattern from the mold; means to automatically operate said jolt means of each unit when the unit has reached one point in its path around the axis of the turret; and means to automatically operate said squeezing and pattern drawing means of each unit when the unit has reached another point in its path.

17. A foundry apparatus comprising a rotatably mounted turret; a plurality of mold-forming units carried by said turret and spaced around its axis of rotation, each unit being adapted to support a mold flask and pattern and comprising means adapted to be operated to jolt the flask, and means adapted to be operated to squeeze sand within the flask and draw the pattern from the mold; power-driven means to rotate the turret step-by-step; means operated by said power-driven means to automatically operate said jolt means of each unit when the unit has reached one point in its path around the axis of the turret; and means operated by said power-driven means to automatically operate said squeezing and pattern-drawing means of each unit when the unit has reached another point in its path.

18. A foundry apparatus comprising a rotatably mounted turret; a plurality of mold-forming mechanisms carried by said turret and spaced around its axis of rotation, each mechanism being adapted to support a mold flask and pattern and comprising means adapted to be pneumatically operated to jolt the flask, and means adapted to be pneumatically operated to squeeze sand within the flask and draw the pattern from the mold; power-driven means to rotate the turret step-by-step; means operated by said power-driven means adapted to automatically cause the jolt operation when the mechanism has reached one position in its path around the axis of the turret; and means operated by said power-driven means adapted to automatically cause the mold-squeezing and pattern-drawing operations when the mechanism has reached another point in its circular path.

19. A foundry apparatus comprising a rotatably mounted turret; a plurality of mold-forming mechanisms carried by said turret and spaced around its axis of rotation, each mechanism being adapted to support a mold flask and pattern and comprising means adapted to be pneumatically operated to jolt the flask, means adapted to be pneumatically operated to squeeze sand within the flask and draw the pattern from the mold, and an air valve to control said jolt and squeeze operations; power-driven means to rotate the turret step-by-step; means operated by said power-driven means to automatically operate the said air valve of each mechanism to start and stop the jolt when the mechanism has reached one position in its path around the axis of the turret; and means operated by said power-driven means to automatically operate said air valve of each mechanism to cause the mold-squeezing and pattern-drawing operations when the mechanism has reached another point in its circular path.

20. A foundry apparatus comprising a rotatavly mounted turret; a plurality of mold-forming mechanisms carried by said turret and spaced around its axis of rotation, each mechanism being adapted to support a mold flask and pattern and comprising means adapted to be pneumatically operated to jolt the flask, and means adapted to be pneumatically operated to squeeze sand within the flask and draw the pattern from the mold; power-driven means to rotate the turret step-by-step; means to automatically cause the jolt operation when the mechanism has reached one position in its path around the axis of the turret; and means to automatically cause the mold-squeezing and pattern-drawing operations when the mechanism has reached another point in its circular path.

21. In a foundry apparatus, a rotatably mounted turret, a plurality of mold-flask-supporting means carried by said turret and spaced around its axis of rotation; sand delivery means having a pair of flask-charging openings located adjacent each other at a point located over the path of the flasks as they are moved by the rotation of the turret; two separate sand-supplying means connected respectively to the two different openings; and means adapted to automatically open said charging openings when each flask is passed beneath them by the rotation of the turret and to automatically close the openings when the flask is passed out from beneath them.

22. A foundry apparatus comprising a turntable adapted to support a plurality of mold flasks and patterns at spaced points around its axis; power-driven means adapted to rotate said turntable intermittently and move the flasks in a circular path by steps and allow a dwell period of the turntable after each step; means to automatically jolt the sand in each flask at one point in its circular path; means to automatically squeeze the sand in each flask and draw the pattern therefrom at another point in its path; and means to automatically deliver each flask with a completed mold away from the turntable at still another point in its path, said jolt means, squeezing and drawing means and flask-delivery means being adapted to operate during each dwell period in the sequence of first a delivery of one flask with its mold, next the jolting of the sand in another flask, and third the squeezing and drawing operation upon the sand in still another flask.

23. A foundry apparatus comprising a plurality of pneumatically operated mold-forming mechanisms each adapted to perform a plurality of different mold-forming operations; means supporting said mechanisms for travel in a circular path in spaced relation to each other; means to automatically cause a mold-forming operation of one character by each of said mechanisms when it reaches one point in its circular path; and means to automatically cause a mold-forming operation of another character by each mechanism when it reaches another point in its path.

24. A foundry apparatus comprising a support for a mold flask and pattern mounted to be moved to carry said flask in a circular path; a flask conveyor track located at a fixed point in said path and leading outwardly therefrom; a flask conveyor track mounted adjacent the flask support to travel with it; and mechanical means to cause a transfer of the flask from its support to said second track and over the latter to said fixed track when the flask support reaches a point opposite the fixed track.

25. A foundry apparatus comprising a support for a mold flask and pattern mounted to be moved to carry said flask in a fixed circular path; means to perform a mold-forming operation upon the sand within the flask upon the support; a flask-conveyor track leading outwardly from a fixed point in said path; a flask-conveyor track mounted adjacent the flask support to travel with it, said two tracks being adapted to register with each other in one position of the flask support in its path; and means to automatically cause a transfer of the flask from its support to said adjacent track whereby it may travel thereon and on to the fixed track when the two tracks are in register.

26. A foundry apparatus comprising a plurality of mold-forming mechanisms each including a flask support; means supporting said mechanisms for movement in a fixed circular path in spaced relation to each other; a flask conveyor track leading outwardly from a fixed point in said path; and a plurality of flask conveyor devices mounted to travel with said mechanisms respectively and adapted to deliver the flasks successively to said fixed track when they are carried to a point adjacent the latter.

27. A foundry apparatus comprising a plurality of mold-forming mechanisms each including a flask support; means supporting said mechanisms for movement in a fixed circular path; a plurality of flask conveyor tracks mounted to travel with said mechanisms respectively and to deliver the flasks laterally outward; and means to automatically effect a transfer of each flask from its support to an adjacent one of said tracks when the flask reaches one point in its path.

28. In a foundry apparatus, a rotatably mounted turret; a plurality of mold-flask-supporting and jolting mechanisms carried by said turret, spaced around its axis of rotation and adapted to be pneumatically operated; means to automatically cause the operation of each jolt mechanism when the latter reaches one of its positions around the turret axis; a pneumatically operated shiftable support mounted to be moved into a position to support the turret at said jolt position; and means to automatically cause the shifting of said support into operative position before the jolt operation and out of operative position after the conclusion of said operation.

29. In a foundry apparatus a rotatably mounted turret; a plurality of mold-forming mechanisms carried by said turret at spaced points about the axis thereof and each including a mold flask support; a sand delivery chute supported at one point over the path of the flasks upon said supports and adapted to charge the flasks with sand as they pass beneath it; and closure plates carried by the turret extending between adjacent flasks and adapted to close the delivery end of the chute when there is no flask beneath it.

30. A foundry apparatus comprising a rotatably mounted turret adapted to support a plurality of mold flasks and patterns at spaced points around its axis; power-driven means to rotate said turntable intermittently and carry the flasks step by step and allow a dwell period after each step; means to automatically perform a jolt operation upon the sand in one flask during a dwell period; means to automatically perform a pattern-drawing operation upon the sand in another flask during said dwell period; means to automatically convey a flask with a completed mold away from the turntable during said dwell period; and timing means to cause said jolt operation to occur at a different time in the dwell period from the pattern-drawing and the flask-conveying operations to prevent the transmission of jolt shocks to the molds.

31. A foundry apparatus comprising a rotatably mounted turret adapted to support a plurality of mold flasks and patterns at spaced points around its axis; power-driven means to rotate said turntable intermittently and carry the flasks step by step and allow a dwell period after each step; means to automatically perform a jolt operation upon the sand in one flask during a portion of a dwell period; and means to automatically draw the pattern from another flask during another portion of said dwell period and prevent the simultaneous occurrence of the jolt and pattern-drawing operations.

32. In a foundry apparatus, a rotatably mounted turret; a plurality of mold-flask-supporting and jolting mechanisms carried by said turret and spaced around its axis of rotation; and means to automatically operate each of said mechanisms to jolt the flask supported thereby when the mechanism is in one of its positions around the axis of the machine.

33. In a foundry apparatus, a rotatably mounted turret; a plurality of mold-flask-supporting and jolting mechanisms carried by said turret and spaced around its axis of rotation; means to cause the operation of each jolt mechanism when the latter reaches one of its positions around the turret axis; and a pneumatically operated shiftable support adapted to be moved into a position to support the turret at said jolt position and to be moved out of said position after the conclusion of the jolt operation.

34. A foundry apparatus comprising a rotatably mounted turret; a plurality of mold-forming units carried by said turret and spaced around its axis of rotation, each unit being adapted to support and carry a mold flask and pattern to travel with it around the axis and including means adapted to be operated to jolt the sand in the flask, and means adapted to be operated to squeeze the sand to form the mold; means to automatically charge each flask with sand at a position in its path around the axis of the turret; means to operate said sqeezing means of each unit when the unit has reached one point in its path and means to automatically deliver the flask laterally away from each unit when the unit has reached another point in its path.

In testimony whereof I hereunto affix my signature.

WILLIAM H. NICHOLLS.